(12) United States Patent
Kinoshita et al.

(10) Patent No.: US 8,294,744 B2
(45) Date of Patent: Oct. 23, 2012

(54) OPTICAL WRITING DEVICE, IMAGE FORMING APPARATUS, METHOD OF CONTROLLING OPTICAL WRITING DEVICE, AND COMPUTER PROGRAM PRODUCT

(75) Inventors: Izumi Kinoshita, Hyogo (JP); Kunihiro Komai, Osaka (JP); Tatsuya Miyadera, Osaka (JP); Yoshinori Shirasaki, Osaka (JP); Takuhei Yokoyama, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 143 days.

(21) Appl. No.: 12/862,144

(22) Filed: Aug. 24, 2010

(65) Prior Publication Data
US 2011/0043592 A1 Feb. 24, 2011

(30) Foreign Application Priority Data

Aug. 24, 2009 (JP) ................................. 2009-193322
Aug. 20, 2010 (JP) ................................. 2010-184586

(51) Int. Cl.
*B41J 2/385* (2006.01)
*B41J 2/455* (2006.01)
*B41J 2/47* (2006.01)
*B41J 2/45* (2006.01)
*B41J 2/435* (2006.01)

(52) U.S. Cl. ........ 347/234; 347/130; 347/233; 347/238; 347/248

(58) Field of Classification Search ........................ None
See application file for complete search history.

(56) References Cited

U.S. PATENT DOCUMENTS

| | | | |
|---|---|---|---|
| 7,679,634 B2 | 3/2010 | Komai et al. | |
| 2007/0188583 A1* | 8/2007 | Nomura et al. | 347/132 |
| 2008/0240756 A1* | 10/2008 | Kurose et al. | 399/51 |

FOREIGN PATENT DOCUMENTS

| | | |
|---|---|---|
| JP | 2007-88928 | 4/2007 |
| JP | 2008-36850 | 2/2008 |
| JP | 2009-27683 | 2/2009 |

* cited by examiner

*Primary Examiner* — Matthew Luu
*Assistant Examiner* — Kendrick Liu
(74) *Attorney, Agent, or Firm* — Oblon, Spivak, McClelland, Maier & Neustadt, L.L.P.

(57) ABSTRACT

An optical writing device includes: a light source including arrays arranged in a main scanning direction, each array including light-emitting elements arranged in the main scanning direction; a correction-value holding unit to hold, correspondingly with a light-emitting element, a correction value for changing timing to read out pixel data stored in an image storage unit; and a light-source drive unit to drive the light source by reading out the stored pixel data stored, according to the correction value. The correction-value holding unit includes a first area for holding a first correction value corresponding to a first light-emitting element located at an end of an array and a second area for holding a second correction value corresponding to a second light-emitting element other than the first light-emitting element, the first holding area being larger than the second holding area.

12 Claims, 10 Drawing Sheets

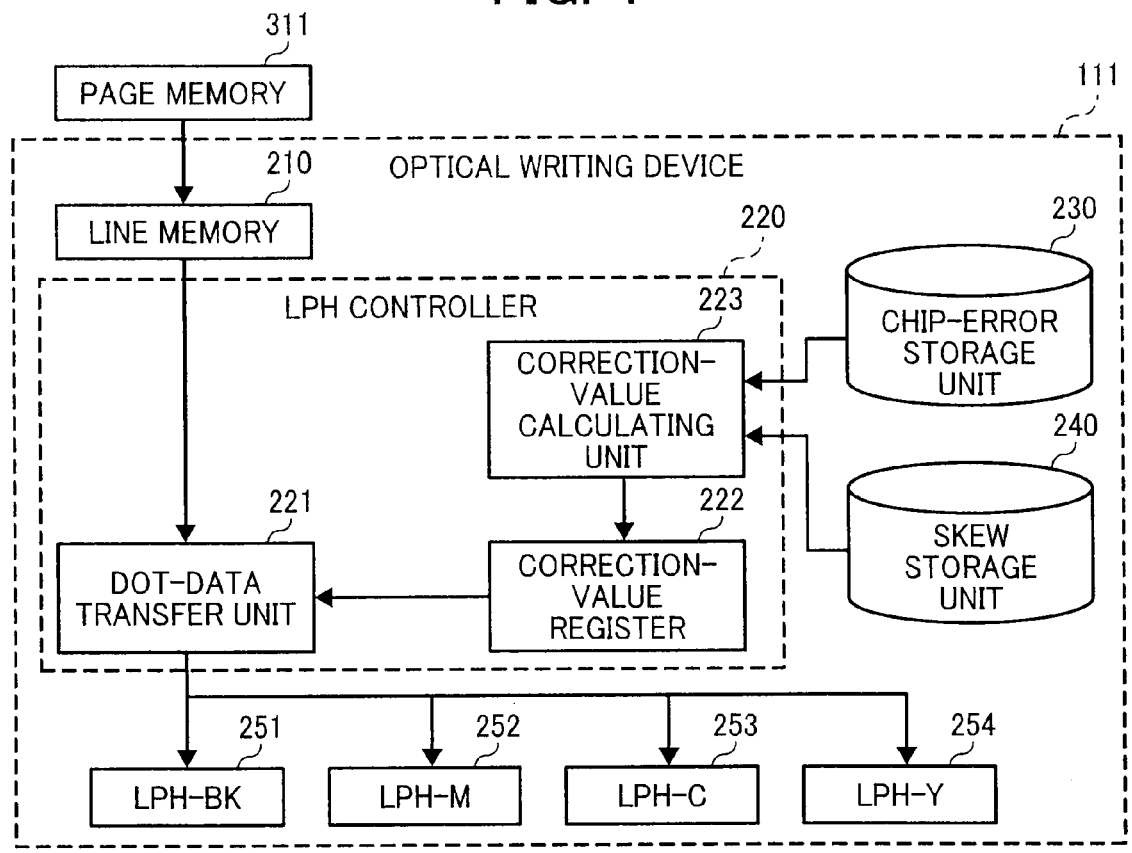

FIG. 6
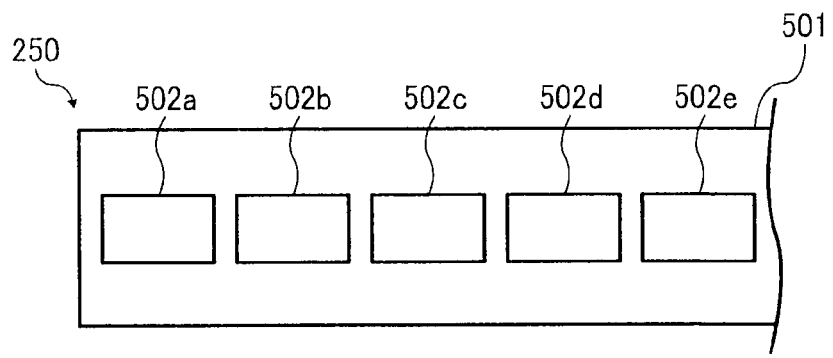
FIG. 7
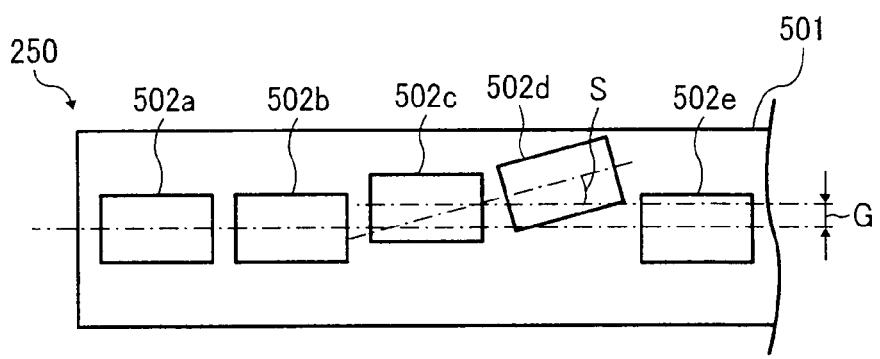
FIG. 8
| DOT No. | PLACEMENT POSITION |
|---|---|
| 1 | $(X_1, Y_1)$ |
| 2 | $(X_2, Y_2)$ |
| 3 | $(X_3, Y_3)$ |
| 4 | $(X_4, Y_4)$ |
| ⋮ | |

FIG. 9

| LIGHT SOURCE CHIP No. | 01 | | 02 | | 03 | | 04 | | ... | 26 | |
|---|---|---|---|---|---|---|---|---|---|---|---|
| DOT No. | 01 | 97 | 01 | 97 | 01 | 97 | 01 | 97 | | 01 | 97 |
| AMOUNT OF POSITIONAL DEVIATION | 0 | 0 | 0 | 0 | 3 | 3 | 3 | 5 | | 0 | 0 |

FIG. 10

| REGISTER No. | BIT LENGTH | CORRESPONDING DOT No. | |
|---|---|---|---|
| 1 | 2 | 001 | ⎫ |
| 2 | 2 | 025 | |
| 3 | 2 | 049 | |
| 4 | 2 | 073 | ⎬ 1st CHIP |
| 5 | 2 | 097 | |
| 6 | 2 | 121 | |
| 7 | 2 | 145 | |
| 8 | 2 | 169 | ⎭ |
| 9 | 4 | 193 | |
| 10 | 2 | 217 | ⎫ |
| 11 | 2 | 241 | |
| 12 | 2 | 265 | |
| 13 | 2 | 289 | ⎬ 2nd CHIP |
| 14 | 2 | 313 | |
| 15 | 2 | 337 | |
| 16 | 2 | 361 | ⎭ |
| 17 | 4 | 385 | |

FIG. 11

| REG [1 : 0]<br>2-BIT<br>REGISTER | BIT [1] | 0 : 1 LINE IN POSITIVE DIRECTION |
| --- | --- | --- |
| | | 1 : 1 LINE IN NEGATIVE DIRECTION |
| | BIT [0] | 0 : NO CORRECTION  1 : CORRECTION |

FIG. 12

| REG [3 : 0]<br>4-BIT<br>REGISTER | BIT [3 : 1] | 000 : 1 LINE IN POSITIVE DIRECTION |
| --- | --- | --- |
| | | 001 : 2 LINES IN POSITIVE DIRECTION |
| | | 010 : 3 LINES IN POSITIVE DIRECTION |
| | | 011 : 4 LINES IN POSITIVE DIRECTION |
| | | 100 : 1 LINE IN NEGATIVE DIRECTION |
| | | 101 : 2 LINES IN NEGATIVE DIRECTION |
| | | 110 : 3 LINES IN NEGATIVE DIRECTION |
| | | 111 : 4 LINES IN NEGATIVE DIRECTION |
| | BIT [0] | 0 : NO CORRECTION  1 : CORRECTION |

| FIG. 13A |
|----------|
| FIG. 13B |

| REGISTER No. | BIT LENGTH | CORRESPONDING DOT No. | SET VALUE | |
|---|---|---|---|---|
| 1 | 2 | 001 | 00 | 1st CHIP |
| 2 | 2 | 025 | 00 | |
| 3 | 2 | 049 | 00 | |
| 4 | 2 | 073 | 00 | |
| 5 | 2 | 097 | 00 | |
| 6 | 2 | 121 | 00 | |
| 7 | 2 | 145 | 00 | |
| 8 | 2 | 169 | 00 | NO POSITION CORRECTION |
| 9 | 4 | 193 | 0000 | |
| 10 | 2 | 217 | 00 | 2nd CHIP |
| 11 | 2 | 241 | 00 | |
| 12 | 2 | 265 | 00 | |
| 13 | 2 | 289 | 00 | |
| 14 | 2 | 313 | 00 | |
| 15 | 2 | 337 | 00 | |
| 16 | 2 | 361 | 00 | |

FIG. 13B

| | | | | | |
|---|---|---|---|---|---|
| 17 | 4 | 385 | 1110 | 3 LINES IN NEGATIVE DIRECTION | |
| 18 | 2 | 409 | 00 | | |
| 19 | 2 | 433 | 00 | | |
| 20 | 2 | 457 | 00 | | 3rd CHIP |
| 21 | 2 | 481 | 00 | NO POSITION CORRECTION | |
| 22 | 2 | 505 | 00 | | |
| 23 | 2 | 529 | 00 | | |
| 24 | 2 | 553 | 00 | | |
| 25 | 4 | 577 | 0000 | | |
| 26 | 2 | 601 | 00 | | |
| 27 | 2 | 625 | 11 | | |
| 28 | 2 | 649 | 00 | TILT CORRECTION | 4th CHIP |
| 29 | 2 | 673 | 11 | | |
| 30 | 2 | 697 | 00 | | |
| 31 | 2 | 721 | 11 | | |
| 32 | 2 | 745 | 00 | | |

OPTICAL WRITING DEVICE, IMAGE FORMING APPARATUS, METHOD OF CONTROLLING OPTICAL WRITING DEVICE, AND COMPUTER PROGRAM PRODUCT

CROSS-REFERENCE TO RELATED APPLICATIONS

The present application claims priority to and incorporates by reference the entire contents of Japanese Patent Application No. 2009-193322 filed in Japan on Aug. 24, 2009 and Japanese Patent Application No. 2010-184586 filed in Japan on Aug. 20, 2010.

BACKGROUND OF THE INVENTION

1. Field of the Invention

The present invention relates to an optical writing device, an image forming apparatus, a method of controlling the optical writing device, and a computer program product, and more particularly, to correction of an error in installation of an optical writing device that exposes a photosensitive element.

2. Description of the Related Art

Recently, digitization of information tends to be promoted, and image forming apparatuses, like printers and facsimile machines used for output of digitized information and scanners used for digitization of documents, have become essential apparatuses. Many image forming apparatuses include imaging functions, image forming functions, communication functions, and the like, to be configured as multifunction peripherals that are usable as printers, facsimile machines, scanners, and copiers.

Of these image forming apparatuses, electrophotographic image forming apparatuses are widely used as image forming apparatuses used for output of digitized documents. An electrophotographic image forming apparatus forms an electrostatic latent image on a photosensitive element by exposing a photosensitive element, and develops the electrostatic latent image into a toner image using a developer such as toner, and transfers the toner image onto a sheet of paper to output the sheet of paper.

In such an electrophotographic image forming apparatus, an image to be output is divided into lines, and image formation is performed per line. In general, an optical writing device, which emits a laser beam, exposes a photosensitive element to a laser beam per line to form an electrostatic latent image. As a light source of such an optical writing device, a light-emitting diode print head (LPH) may be used.

Problems that optical writing devices such as LPHs have include a problem of an error in their installation in image forming apparatuses. An LPH is mechanically installed to an image forming apparatus, and in this mechanical installation, the LPH may be installed with a tilt from its proper state, or an installation position may be tilted due to causes such as vibrations caused by an operation of the apparatus, a change in temperature, a change over time, or the like. These are generally called "skew". If the LPH is tilted from the proper state, an output light from a light-emitting element is not accurately emitted to an image forming position on a photosensitive element exposed by the LPH. This may cause a reduction in image quality, a color shift among C (cyan), M (magenta), Y (yellow), and K (blacK) colors, or the like.

Against this problem, a technique for correcting a tilt by setting main scanning dividing positions in advance and employing a candidate dividing position closest to a set dividing position as a dividing position in a main scanning direction has been proposed (for example, see Japanese Patent Application Laid-open No. 2009-27683). Furthermore, a method for correcting a skew by allocating image data to banks to write them in a memory table has been proposed (for example, see Japanese Patent Application Laid-open No. 2008-36850).

In a typical LPH, semiconductor chips each including light-emitting elements integrated together are mounted on a substrate to satisfy a width in a main scanning direction. For example, 192 dots of light-emitting elements are integrated on each semiconductor chip at intervals of 42.3 micrometers, and 26 of this semiconductor chip are mounted on a substrate, whereby an LPH of 600-dpi in A4 size is formed.

In this LPH, as described above, one semiconductor chip is generated by integrating light-emitting elements, so a positional deviation does not become a problem among the light-emitting elements in that one semiconductor chip. However, when plural semiconductor chips are mounted on a substrate, a positional deviation among the semiconductor chips may occur. Therefore, in addition to a tilt upon installation of an LPH in an image forming apparatus, the positional deviation among the semiconductor chips inside the LPH may cause the above described reduction in image quality, color shift, and the like.

In each of Japanese Patent Application Laid-open No. 2009-27683 and Japanese Patent Application Laid-open No. 2008-36850, the tilt upon installation of the LPH to the image forming apparatus is considered, but a positional deviation among semiconductor chips inside the LPH is not considered. Furthermore, when using the methods disclosed in Japanese Patent Application Laid-open No. 2009-27683 and Japanese Patent Application Laid-open No. 2008-36850, scales of circuits required for control are increased and packaging thereof becomes difficult.

These problems are not limited to LPHs, and may also become problems for any light source of an optical writing device including plural chips connected in a main scanning direction.

SUMMARY OF THE INVENTION

It is an object of the present invention to at least partially solve the problems in the conventional technology.

According to an aspect of the present invention, an optical writing device that exposes a photosensitive element of an image forming apparatus based on pixel data forming image information, includes: a light source including a plurality of light-emitting element arrays arranged in a main scanning direction, each light-emitting element array including a plurality of light-emitting elements arranged in the main scanning direction; a correction-value holding unit configured to hold, correspondingly with a light-emitting element, a correction value for changing timing to read out the pixel data stored in an image storage unit; and a light-source drive unit configured to drive the light source by reading out the pixel data stored in the image storage unit, according to the correction value. The correction-value holding unit includes a first holding area for holding a first correction value corresponding to a first light-emitting element located at an end of a light-emitting element array and a second holding area for holding a second correction value corresponding to a second light-emitting element other than the first light-emitting element, the first holding area being larger than the second holding area.

According to another aspect of the present invention, an image forming apparatus includes the above optical writing device.

According to still another aspect of the present invention, a method of controlling the optical writing device includes: calculating a correction value for each light-emitting element based on placement error information related to an error in placement of a light-emitting element array in the light source, and tilt information related to a tilt of the light source; and driving and controlling the light source by reading out the pixel data stored in an image storage unit according to the correction value calculated. In the calculating, a first correction value corresponding to a first light-emitting element located at an end of the light-emitting element array is calculated, the first correction value having a longer bit length than that of a second correction value corresponding to a second light-emitting element other than the first light-emitting element.

According to yet another aspect of the present invention, a computer program product includes a computer-usable medium having computer-readable program codes embodied in the medium for controlling the optical writing device and the program codes when executed causes the optical writing device to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a configuration of an optical writing device according to the embodiment of the present invention;

FIG. 5 is a diagram illustrating an example of a storage area of a line memory according to the embodiment of the present invention;

FIG. 6 is a diagram schematically illustrating a configuration of an LPH according to the embodiment of the present invention;

FIG. 7 is a diagram illustrating an example of positional deviations among light source chips in the LPH according to the embodiment of the present invention;

FIG. 8 is a diagram illustrating an example of information stored in a chip-error storage unit according to the embodiment of the present invention;

FIG. 9 is a diagram illustrating an example of correction value information calculated based on chip error information according to the embodiment of the present invention;

FIG. 10 is a diagram illustrating a register configuration of a correction-value register according to the embodiment of the present invention;

FIG. 11 is a diagram illustrating an example of register values in the correction-value register according to the embodiment of the present invention;

FIG. 12 is a diagram illustrating an example of register values in the correction-value register according to the embodiment of the present invention;

FIG. 13 is a diagram illustrating an example of set values of the correction-value register according to the embodiment of the present invention;

DETAILED DESCRIPTION OF THE PREFERRED EMBODIMENTS

[First Embodiment]

An embodiment of the present invention is explained in detail below with reference to the accompanying drawings. In the present embodiment, as an image forming apparatus to which the present invention is applied, a multi function peripheral (MFP) is described as an example. The MFP according to the present embodiment is an electrophotographic MFP, and includes, as an optical writing device for forming an electrostatic latent image on a photosensitive element, an optical writing device using a light emitting diode print head (LPH), which is a light-emitting body array formed of a plurality of light source chips connected in the main scanning direction, as a light source. In the present embodiment, the case of using an LED element as a light source is described as an example, but a type of the light source is not limited to an LED, and another light source may be used. Furthermore, the image forming apparatus is not limited to the MFP, and, for example, may be a copier, a printer, or a facsimile machine.

Figure 1:
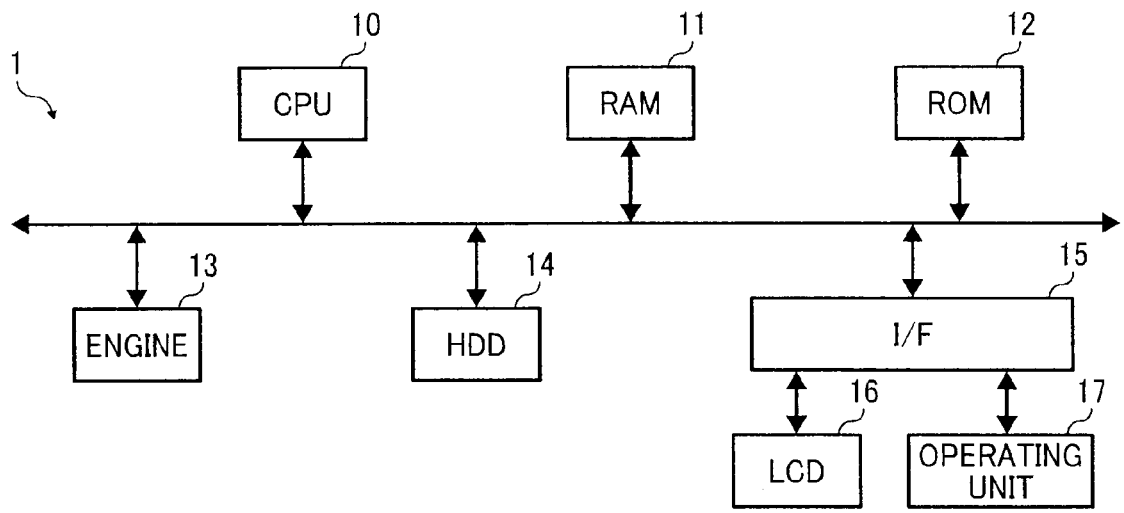
FIG. 1 is a block diagram illustrating a hardware configuration of an image forming apparatus according to an embodiment of the present invention.

FIG. 1 is a block diagram illustrating a hardware configuration of an image forming apparatus (MFP) 1 according to the present embodiment. As illustrated in FIG. 1, the image forming apparatus 1 according to the present embodiment has an engine that executes image formation in addition to a configuration similar to that of a commonly-used server or information processing terminal such as a personal computer (PC). Specifically, in the image forming apparatus 1 according to the present embodiment, a central processing unit (CPU) 10, a random access memory (RAM) 11, a read only memory (ROM) 12, an engine 13, a hard disk drive (HDD) 14, and an I/F 15 are connected to one another via a bus 18. Furthermore, a liquid crystal display (LCD) 16 and an operating unit 17 are connected to the I/F 15.

The CPU 10 controls an overall operation of the image forming apparatus 1 in accordance with a program stored in the ROM 12. The RAM 11 is a volatile storage medium capable of high-speed reading and writing, and is used as a work area when the CPU 10 processes information. The ROM 12 is a read-only nonvolatile storage medium, and stores therein a program such as firmware. The engine 13 is a mechanism that actually executes image formation in the IMAGE FORMING APPARATUS 1.

The HDD 14 is a nonvolatile storage medium capable of reading and writing information and stores therein an operating system (OS), various control programs, application programs, and the like. The I/F 15 connects and controls the bus 18 and various hardware, a network, and the like. The LCD 16 is a visual user interface for a user to check the status of the image forming apparatus 1. The operating unit 17 is a user interface, such as a keyboard and a mouse, for a user to input information to the image forming apparatus 1.

In such a hardware configuration, a software control unit is implemented, by a program stored in the ROM 12, the HDD 14, or a storage medium such as an optical disk (not illustrated) being read out to the RAM 11 and running in accordance with the control of the CPU 10. Functional blocks that realize functions of the image forming apparatus 1 according to the present embodiment are each formed of a combination of the software control unit implemented in this manner and hardware.

Figure 2:
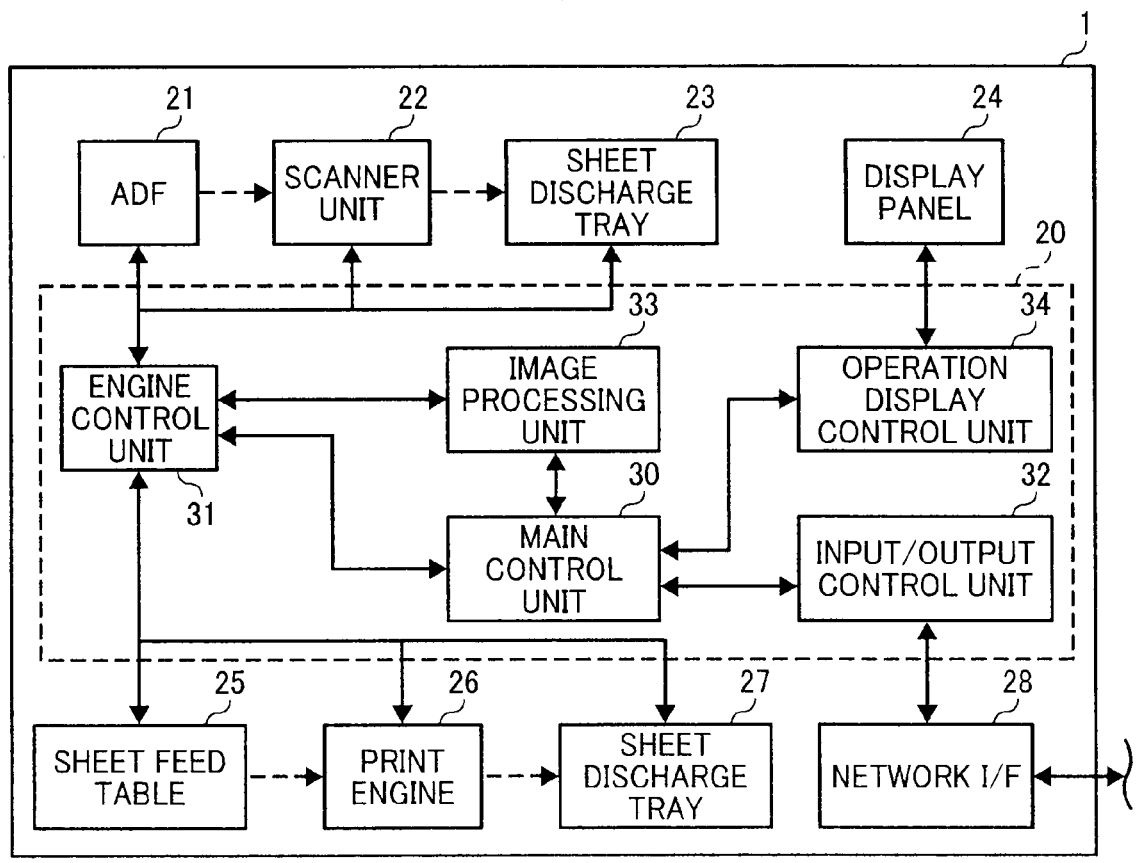
FIG. 2 is a diagram illustrating a functional configuration of the image forming apparatus according to the embodiment of the present invention.

Next, a functional configuration of the image forming apparatus 1 according to the present embodiment is explained with reference to FIG. 2. As illustrated in FIG. 2, the image forming apparatus 1 according to the present embodiment has a controller 20, an automatic document feeder (ADF) 21, a scanner unit 22, a sheet discharge tray 23, a display panel 24, a sheet feed table 25, a print engine 26, a sheet discharge tray 27, and a network I/F 28.

The controller 20 has a main control unit 30, an engine control unit 31, an input/output control unit 32, an image processing unit 33, and an operation display control unit 34. As illustrated in FIG. 2, the image forming apparatus 1 according to the present embodiment includes the scanner unit 22 and the print engine 26. In FIG. 2, electrical connections are indicated by solid arrows, and the flow of a sheet is indicated by dashed arrows.

The display panel 24 is an output interface that visually displays the status of the image forming apparatus 1 and also an input interface (an operating unit) that is a touch panel, for a user to directly operate the image forming apparatus 1 or input information to the image forming apparatus 1. The network I/F 28 is an interface for the image forming apparatus 1 to communicate with other devices via a network, and Ethernet (registered trademark) or a USB (Universal Serial Bus) interface is used as the network I/F 28.

The controller 20 is formed of a combination of software and hardware. Specifically, a control program, such as firmware, stored in the ROM 12, a nonvolatile memory, the HDD 14, or a nonvolatile recording medium such as an optical disk, is loaded into a volatile memory (hereinafter, a "memory") such as the RAM 11, and the controller 20 is formed of the software control unit implemented in accordance with the control of the CPU 10 and hardware such as an integrated circuit. The controller 20 serves as a control unit that controls the overall image forming apparatus 1.

The main control unit 30 has a role of controlling each unit included in the controller 20, and supplies instructions to each unit of the controller 20. The engine control unit 31 serves as a drive unit that controls or drives the print engine 26, the scanner unit 22, and the like.

The input/output control unit 32 inputs a signal or an instruction input via the network I/F 28 to the main control unit 30. Furthermore, the main control unit 30 controls the input/output control unit 32, and accesses other devices via the network I/F 28.

The image processing unit 33 generates rendering information based on print information included in an input print job in accordance with the control by the main control unit 30. The rendering information is information for rendering an image to be formed in the image forming operation by the print engine 26, which is an image forming unit. Furthermore, the print information included in the print job is image information converted by a printer driver installed in an information processing apparatus, such as a PC, into a form recognizable by the image forming apparatus 1. The operation display control unit 34 displays information on the display panel 24 or notifies the main control unit 30 of information input via the display panel 24.

When the image forming apparatus 1 operates as a printer, first, the input/output control unit 32 receives a print job via the network I/F 28. The input/output control unit 32 transfers the received print job to the main control unit 30. When the main control unit 30 receives the print job, the main control unit 30 controls the image processing unit 33 and causes the image processing unit 33 to generate rendering information based on the print information included in the print job. The generated rendering information is stored in a page memory in the engine control unit 31.

When the rendering information is generated by the image processing unit 33, the engine control unit 31 causes the print engine 26 to execute image formation on a sheet of paper fed from the sheet feed table 25 based on the generated rendering information. That is, the print engine 26 serves as an image forming unit. In the print engine 26, an electrostatic latent image is formed by the optical writing device exposing a photosensitive drum, based on the rendering information stored in the page memory in the engine control unit 31. A toner image formed by the electrostatic latent image being developed is transferred onto the sheet fed from the sheet feed table 25, and the image formation is completed. The sheet subjected to the image formation by the print engine 26 is discharged onto the sheet discharge tray 27.

When the image forming apparatus 1 operates as a copier, the image processing unit 33 generates rendering information based on imaging information which the engine control unit 31 receives from the scanner unit 22 or image information generated by the image processing unit 33. Similarly to the printer operation, based on this rendering information, the engine control unit 31 drives the print engine 26.

Figure 3:
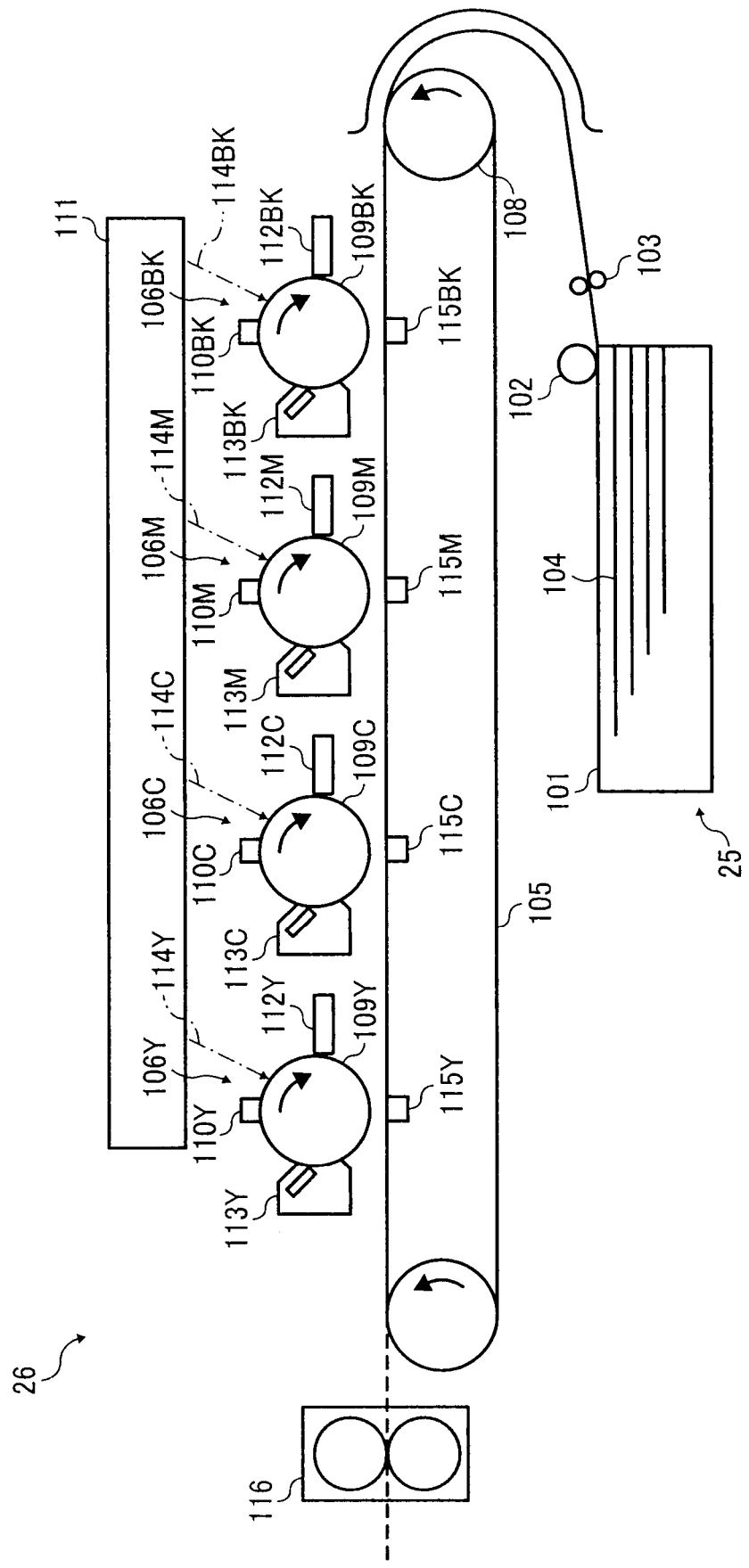
FIG. 3 is a diagram illustrating a configuration of a print engine according to the embodiment of the present invention.

Next, a configuration of the print engine 26 according to the present embodiment is explained with reference to FIG. 3. As illustrated in FIG. 3, the print engine 26 according to the present embodiment includes image forming units for different colors, which are arranged along a conveying belt 105 that is an endless moving unit, and is of a so-called tandem type. That is, a plurality of image forming units (electrophotographic process units) 106BK, 106M, 106C, and 106Y are sequentially arranged from upstream in a conveying direction of the conveying belt 105 along the conveying belt 105, which conveys a sheet of paper (a recording sheet of paper) 104 separated and fed from a sheet tray 101 by a sheet feed roller 102 and a separation roller 103.

The plurality of image forming units 106BK, 106M, 106C, and 106Y only differ from one another in their colors of toner images to be formed and have the same internal configuration. The image forming unit 106BK forms a black image, the image forming unit 106M forms a magenta image, the image forming unit 106C forms a cyan image, and the image forming unit 106Y forms a yellow image. In the description below, the image forming unit 106BK will be explained specifically, and since the other image forming units 106M, 106C, and 106Y are similar to the image forming unit 106BK, for each element of the image forming units 106M, 1060, and 106Y, a reference numeral distinguished by "M", "C", or "Y" respectively will be used in the drawing in place of "BK" used for each element of the image forming unit 106BK, and explanation thereof will be omitted.

The conveying belt 105 is an endless belt supported by a drive roller 107, which is driven to rotate, and a driven roller 108. The drive roller 107 is driven to rotate by a drive motor not illustrated. The drive motor, the drive roller 107, and the driven roller 108 serve as a drive unit that causes the conveying belt 105, which is the endless moving unit, to move.

In the image formation, the topmost sheet of sheets 104 of paper accommodated in the sheet tray 101 is sequentially fed out, attracted to the conveying belt 105 by the electrostatic attractive action, and conveyed to the first image forming unit 106BK by the movement of the conveying belt 105, to be transferred with a black toner image.

The image forming unit 106BK includes a photosensitive drum 109BK as a photosensitive element, as well as a charger 110BK, an optical writing device 111, a developing unit 112BK, a photosensitive element cleaner (not illustrated), a static eliminator 113BK, and the like, which are arranged around the photosensitive drum 109BK. The optical writing device 111 according to the present embodiment includes an LPH as a light source, and is configured to emit write lights 114BK, 114M, 114C, and 114Y to the respective photosensitive drums. In the example of FIG. 3, the optical writing device 111 is also used as one component of the other image forming units 106M, 106C, and 106Y.

In the image formation, the outer circumferential surface of the photosensitive drum 109BK is uniformly charged by the charger 110BK in the dark, and thereafter writing on the photosensitive drum 109BK is performed by the write light 114BK corresponding to a black image from the optical writing device 111, and an electrostatic latent image is formed on the photosensitive drum 109BK. The developing unit 112BK develops the electrostatic latent image into a visible image using a black toner, whereby a black toner image is formed on the photosensitive drum 109BK.

The toner image is transferred onto the sheet 104 on the conveying belt 105 at the position where the photosensitive drum 109BK and the sheet 104 on the conveying belt 105 contact each other (the transfer position) by the action of a transfer unit 115BK. By this transfer, an image made of the black toner is formed on the sheet 104. After completion of the transfer of the toner image, unnecessary toner remaining on the outer circumferential surface of the photosensitive drum 109BK is removed by the photosensitive element cleaner, static electricity is eliminated by the static eliminator 113BK, and the photosensitive drum 109BK waits for the next image formation.

The sheet 104 onto which the black toner image has been transferred by the image forming unit 106BK as described above is conveyed to the next image forming unit 106M by the conveying belt 105. In the image forming unit 106M, by the same process as the image forming process performed in the image forming unit 106BK, a magenta toner image is formed on the photosensitive drum 109M, and the toner image is transferred onto the sheet 104 so that the magenta toner image is superimposed on the black image formed on the sheet 104.

The sheet 104 is further conveyed to the next image forming units 106C and 106Y, and by the same operation, a cyan toner image formed on the photosensitive drum 109C and a yellow toner image formed on the photosensitive drum 109Y are transferred onto the sheet 104 superimposed onto one another. In this manner, a full-color image is formed on the sheet 104. The sheet 104 on which the full-color superimposed image has been formed is separated from the conveying belt 105, and the image is fixed on the sheet 104 by a fixing unit 116, and after that, the sheet 104 is discharged to the outside of the image forming apparatus.

Next, the optical writing device 111 according to the present embodiment is explained. FIG. 4 is a block diagram illustrating a functional configuration of the optical writing device 111 according to the present embodiment and a connective relation with a page memory 311 included in the engine control unit 31. As illustrated in FIG. 4, the optical writing device 111 according to the present embodiment includes a line memory 210, an LPH controller 220, a chip-error storage unit 230, a skew storage unit 240, an LPH-BK 251, an LPH-M 252, an LPH-C 253, and an LPH-Y 254.

The line memory 210 acquires raster data stored in the page memory 311 per main scanning line, and holds the raster data. Namely, the line memory 210 serves as a line-information storage unit. FIG. 5 illustrates the mode of holding information by the line memory 210. As illustrated in FIG. 5, the line memory 210 holds dot data, i.e., pixel data per pixel for 9 lines from the (n−4)th to (n+4)th lines ("n" is a natural number of 5 or greater).

The LPH controller 220 drives the LPH-BK 251, the LPH-M 252, the LPH-C 253, and the LPH-Y 254 (hereinafter, generally referred to as "LPH 250") in the optical writing device 111. The LPH controller 220 includes the function of correcting a positional deviation among light source chips included in the LPH 250 and an error in installation of the LPH 250 itself, i.e., a skew. As illustrated in FIG. 4, the LPH controller 220 includes a dot-data transfer unit 221, a correction-value register 222, and a correction-value calculating unit 223.

The dot-data transfer unit 221 reads out dot data from the line memory 210, and transfers the dot data to the LPH 250. When reading out the dot data from the line memory 210, the dot-data transfer unit 221 changes the timing to read out pixel data corresponding to each LED element so as to correct the positional deviation among the light source chips or the skew described above, based on a correction value stored in the correction-value register 222. The dot-data transfer unit 221 serves as a light-source drive unit.

As described above, the correction-value register 222 stores therein a correction value for correcting the positional deviation or the skew when the dot-data transfer unit 221 reads out dot data from the line memory 210 and transfers the dot data to the LPH 250. That is, the correction-value register 222 functions as a correction-value holding unit. The correction value stored in the correction-value register 222 is a value calculated by the correction-value calculating unit 223.

The correction-value calculating unit 223 calculates a correction value to be set in the correction-value register 222 per dot, i.e., per LED element based on information stored in the chip-error storage unit 230 and the skew storage unit 240. The functions of the units included in the LPH controller 220 are one of the important points of the present embodiment. The functions of the LPH controller 220 will be described in detail later. Like the controller 20 of the image forming apparatus 1, the LPH controller 220 according to the present embodiment is also formed of a combination of software and hardware.

The LPH 250 is a light source of the optical writing device 111 according to the embodiment, is provided for CMYK colors, and, as illustrated in FIG. 4, is formed of the LPH-BK 251, the LPH-M 252, the LPH-C 253, and the LPH-Y 254. FIG. 6 is a diagram schematically illustrating a configuration of the LPH 250 according to the present embodiment. In FIG. 6, the light-emitting surface of the LPH 250 viewed from the front is illustrated. Furthermore, FIG. 6 illustrates an example of the LPH 250 in an ideal state where there is no positional deviation among the light source chips and no skew.

As illustrated in FIG. 6, the LPH 250 is formed of a plurality of light source chips 502a, 502b, 502c, 502d, 502e, . . . (hereinafter, generally referred to as "light source chips 502") mounted on a substrate 501. The substrate 501 is a holding board that holds the plurality of light source chips 502, and with the plurality of light source chips 502 mounted thereon, mounted on the optical writing device 111. A direction in which the plurality of light source chips 502 are strung is the main scanning direction.

The light source chip 502 is an integrated semiconductor chip, and includes a plurality of LED (Light emitting diode) elements, i.e., light-emitting elements as a light source.

Therefore, the light source chip 502 is a light-emitting element array. The plurality of LED elements included in each of the light source chips 502 are also arranged in the main scanning direction. On each light source chip 502 according to the present embodiment, 192 LED elements for 192 dots are mounted in the main scanning direction. The LPH 250 according to the present embodiment includes 26 light source chips 502 arranged in the main scanning direction. Furthermore, the resolution of the LPH 250 according to the present embodiment is 2400 dpi.

Next, the LPH 250 with positional deviations among the light source chips 502 is illustrated in FIG. 7. In the example of FIG. 7, the light source chips 502a, 502b, and 502e are mounted in the ideal state, but the light source chip 502c is shifted by a width G from the ideal state, and the light source chip 502d is shifted even further and tilted at an angle S. In the manufacturing process of the LPH 250, a manufacturing tolerance as illustrated in FIG. 7 may be generated. One of the important points of the present embodiment is to correct the manufacturing tolerance illustrated in FIG. 7 or the like.

The chip-error storage unit 230 stores therein information on an amount of positional deviation of each LED element in a sub-scanning direction (hereinafter referred to as "chip error information") caused by a positional deviation among the light source chips 502 in the sub-scanning direction as described with reference to FIG. 7. In other words, the chip-error storage unit 230 stores therein chip error information as placement error information related to an error in placement of the light source chips 502, and functions as a placement-error-information storage unit. FIG. 8 illustrates an example of the information stored in the chip-error storage unit 230.

As illustrated in FIG. 8, the information stored in the chip-error storage unit 230 according to the present embodiment is coordinate information indicating the position of each LED element included in the LPH 250. Specifically, in the chip error information according to the present embodiment, the position of each LED element on a plane is indicated by a coordinate system having a reference point at a predetermined point in the LPH 250 illustrated in FIG. 7. The chip error information illustrated in FIG. 8 is provided by a manufacturer that supplies the LPH, in general.

The skew storage unit 240 stores information on the tilt upon installation of the LPH 250 to the optical writing device 111 (hereinafter, referred to as "skew information"). That is, the skew information stored in the skew storage unit 240 is angular information. That is, similarly to the chip-error storage unit 230, the skew storage unit 240 stores angular information for each of the LPH-BK 251, the LPH-M 252, the LPH-C 253, and the LPH-Y 254.

The skew information stored in the skew storage unit 240 is stored by being measured by the image forming apparatus 1. As a method of measuring skew information, first, the image forming apparatus 1 including the optical writing device 111 mounted with the LPH 250, for which a skew is to be measured, prints out a pattern for tilt detection. Then, based on a pattern included in image information generated by a scan of the pattern output on a sheet by the scanner unit 22, the controller 20 calculates the tilt, and skew information is stored based on a result of the calculation. In this operation, the controller 20 functions as a tilt-information generating unit.

Next, a correction value calculated by the correction-value calculating unit 223 is explained. FIG. 9 illustrates information on correction values calculated by the correction-value calculating unit 223. The correction values illustrated in FIG. 9 are calculated based on the chip error information stored in the chip-error storage unit 230 (hereinafter, referred to as "chip-error correction values"). As illustrated in FIG. 9, the chip-error correction values according to the present embodiment are amounts of positional deviation in the sub-scanning direction of the LED elements corresponding to the first dot and the 97th dot of the plurality of LED elements included in each light source chip 502.

Furthermore, as illustrated in FIG. 9, the chip-error correction values according to the present embodiment are the amounts of positional deviation in a direction orthogonal to a straight line joining reference positions, which are at where the first dot of the light source chip 502 disposed at one end in the main scanning direction (the light source chip 502a in FIG. 6), i.e., at where the first dot of the first chip is disposed and at where the 97th dot of the light source chip 502 disposed at the other end, i.e. at where the 97th dot of the 26th chip is disposed. Moreover, each chip-error correction value according to the present embodiment indicates the amount of positional deviation of each LED element from the straight line, which has been converted into the number of pitches in 2400 dpi (one pitch being 10.6 micrometers).

In the example illustrated in FIG. 9, the first chip and the second chip are not positionally deviated. The first dot and the 97th dot of the third chip are both deviated by three dots, and the entire chip is shifted like the light source chip 502c in FIG. 7. The first dot and the 97th dot of the fourth chip differ in amounts of positional deviation, indicating that the chip is tilted like the light source chip 502d in FIG. 7.

In the example of FIG. 9, as described above, the reference positions, which are at where the first dot of the first chip is disposed and at where the 97th dot of the 26th chip is disposed, are joined with the straight line, and the positions of dots inbetween are calculated as amounts of positional deviation from the straight line. Alternatively, for example, straight-line approximation based on known positions of all of the dots as illustrated in FIG. 8 may be performed to obtain amounts of positional deviation from the approximate straight line as the amounts of positional deviation illustrated in FIG. 9.

The correction-value calculating unit 223 calculates the information as illustrated in FIG. 9 for each of the LPH-BK 251, the LPH-M 252, the LPH-C 253, and the LPH-Y 254. The correction-value calculating unit 223 according to the present embodiment recognizes positional relationships among the plurality of LED elements from the coordinate information as described for FIG. 8, and calculates the chip-error correction values as illustrated in FIG. 9. The correction-value calculating unit 223 then sets correction values in the correction-value register 222 while taking into account of the skew information stored in the skew storage unit 240.

Next, the correction-value register 222 is explained. FIG. 10 is a diagram illustrating a register configuration of the correction-value register 222 according to the present embodiment. As illustrated in FIG. 10, the correction-value register 222 according to the present embodiment is provided with register values for correcting positions of the LED elements in the sub-scanning direction, which are at intervals of 24 dots in the main scanning direction, of the plurality of LED elements included in the LPH 250.

Furthermore, as illustrated in FIG. 10, although the bit length of the register is basically two bits, the bit length of a register value corresponding to the LED element arranged at an end of each light source chip 502 is four bits. The correction-value register 222 according to the present embodiment has a register as illustrated in FIG. 10 for each of the LPH-BK 251, the LPH-M 252, the LPH-C 253, and the LPH-Y 254.

In the example of FIG. 10, the example of providing the correction value register by dividing the main scanning direction into 24-dot areas is illustrated, but the number of dots for this area division (hereinafter, referred to as "correction area dot count") is preferably made variable. That is, the correction-value calculating unit 223 preferably calculates the correction values for part of the plurality of LED elements included in each light source chip 502 in units of predetermined LED elements instead of calculating a correction value for every one of the plurality of LED elements included in each light source chip 502. Furthermore, the correction-value register 222 preferably stores therein correction values per predetermined light-emitting elements. Considering a side effect on dither, the correction area dot count preferably does not include a divisor of a prime number of 5 or greater. Furthermore, to perform the correction at uniform intervals throughout the main scanning direction, the correction area dot count is preferably a divisor of the number of the plurality of LED elements included in one light source chip 502.

Next, set values of the correction-value register 222 according to the present embodiment are explained with reference to FIGS. 11 and 12. FIG. 11 is a diagram illustrating contents of the set values when the bit length is two bits, of the registers illustrated in FIG. 10. As illustrated in FIG. 11, one of the two bits indicates whether to correct the position of the corresponding dot. The other one of the two bits indicates whether to shift the position of the corresponding dot by one line, i.e., by one dot in a positive direction or by one line, i.e., by one dot in a negative direction when the position of the corresponding dot is to be corrected. The positive direction and the negative direction here indicate positive and negative in the sub-scanning direction. In this manner, in the correction-value register 222 according to the present embodiment, to the dot corresponding to the register having the bit length of two bits, register values are given such that the position of that dot is shiftable by one dot in the sub-scanning direction.

Next, FIG. 12 is a diagram illustrating contents of set values when the bit length is four bits, of the registers illustrated in FIG. 10. As illustrated in FIG. 12, one of the four bits indicates whether to correct the position of a corresponding dot similarly to the case in FIG. 11. The other three bits indicate which one of one to four lines in the positive direction and one to four lines in the negative direction is a correction amount, i.e., an amount of shift in the sub-scanning direction, when the position of the corresponding dot is to be corrected. In this manner, in the correction-value register 222 according to the present embodiment, the dot corresponding to the register having the bit length of four bits is given register values such that the position of that dot is shiftable by four dots in the sub-scanning direction.

The correction-value register 222 according to the present embodiment holds correction values so as to apply the correction values sequentially from the first dot in the main scanning direction, and when, for example, a correction value indicating a shift by one dot in the positive direction is stored as the correction value of the register No. "2", i.e., of the 25th dot, that correction value is applied to all of the dots thereafter. That is, if the correction value of the register No. "3", i.e., of the 49th dot indicates "no correction", the 49th dot is shifted by one line like the 25th dot. On the contrary, if the correction value of the 49th dot indicates a shift by one dot in the negative direction, the amount of correction of the 49th dot is negative positive zero. Further, if the correction value of the 49th dot indicates a shift by one dot in the positive direction, the amount of correction of the 49th dot corresponds to a shift by two dots in total in the positive direction.

The configurations like FIGS. 11 and 12 are further explained. In the correction-value register 222 according to the present embodiment, four bits are assigned to the register indicating a correction value of an LED element arranged at an end of a light source chip 502 included in the LPH 250, and a positional correction of plus and minus four dots is possible. Two bits are assigned to the register indicating a correction value of each of the other LED elements, and a positional correction of plus and minus one dot is possible.

As described above, positional deviations of the plurality of LED elements included in the LPH 250 according to the present embodiment is caused by the placement of the light source chips 502. When the light source chip 502 is placed tilted like the light source chip 502d in FIG. 7, the positions of the adjacent LED elements are not significantly deviated in the sub-scanning direction, and the positional deviation gradually occurs as it advances in the main scanning direction.

A case in which adjacent light source chips 502 are placed shifted from one another in the sub-scanning direction, like the light source chips 502b and 502c in FIG. 7 is now considered. In this case, the positional deviation between the LED element placed at the end closer to the light source chip 502c in the light source chip 502b and the LED element placed at the end closer to the light source chip 502b in the light source chip 502c, i.e., the amount of positional deviation between the adjacent LED elements placed at the border between the plural light source chips 502, is equal to a shift amount between the adjacent light source chips 502. That is, a greater degree of positional deviation than that between adjacent dots of the light source chip 502 singularly tilted may be generated.

Therefore, in the LPH controller 220 according to the present embodiment, the bit length of the register for correcting the positional deviation of the LED element placed at the border between the light source chips 502 is four bits, and the bit length of the register for correcting the positional deviation of each of the other LED elements is two bits. Accordingly, the bit lengths of the registers are reducible while favorable correction of positional deviations is possible, such that the scale of circuits is reducible.

An example of register values of the correction-value register 222 according to the present embodiment, to which the correction values described with reference to FIG. 9 are applied, is illustrated in FIG. 13. In the example of FIG. 13, a case to which the states of FIG. 9 are directly applied is illustrated, assuming that the LPH 250 is not skewed.

As illustrated in FIG. 13, as register values corresponding to the light source chips 502a and 502b, a value indicating no positional correction is set. At the timing of switching to the light source chip 502c, i.e., as a register value corresponding to the LED element placed at the end closer to the light source chip 502b in the light source chip 502c, a value indicating a shift by three lines in the negative direction is set. As illustrated in FIG. 7, the light source chip 502c is only shifted but not tilted, and thus as register values corresponding to the other LED elements included in the light source chip 502c, a value indicating no position correction is set.

After switching from the light source chip 502c to the light source chip 502d, as a register value of each LED elements included in the light source chip 502d, a correction value for correcting the tilt of the light source chip 502d as illustrated in FIG. 7 is set. In this manner, from the light source chip 502a to the light source chip 502d, a correction of five or more lines is substantially performed, but by the configuration described above, the bit lengths of the registers are reduced, and the scale of circuits are reducible.

When transferring dot data from the line memory 210 to the LPH 250, the dot-data transfer unit 221 according to the present embodiment refers to the register values as illustrated in FIG. 13 per dot transferred, and reads out the dot data from the line memory 210 in accordance with the set correction value. In the example of FIG. 13, for the first to 384th dots, the dot-data transfer unit 221 reads out the dot data of a targeted main scanning line without correction, and transfers the dot data to the LPH 250.

When reading out dot data for the 389th dot, the dot-data transfer unit 221 reads out dot data shifted by three lines in the negative direction in accordance with an amount of correction indicated by the set register value, i.e., three lines in the negative direction. After that, from the 390th to 576th dots, the dot-data transfer unit 221 continues to read out dot data shifted by three lines. That is, depending on the amount of correction indicated by the register value corresponding to the light-emitting element placed at the end of the light source chip 502, the timing to read out image information corresponding to the other light-emitting elements is also corrected. Consequently, the shift of the light source chip 502c in FIG. 7 is corrected. Therefore, the dot-data transfer unit 221 includes a counter that counts the number of dots in the main scanning direction.

Furthermore, from the 577th to 768th dots, the dot-data transfer unit 221 gradually shifts dot data to be read out in accordance with the setting of the register values. Consequently, the tilt of the light source chip 502c in FIG. 7 is corrected. By such a configuration and process, the positional deviation correcting function of the LPH 250 is achieved by the LPH controller 220 according to the present embodiment.

In other words, as for the register configuration of the correction-value register 222 according to the present embodiment, the register values in bold letters in FIG. 10 of the register values illustrated in FIG. 10, i.e., the register values corresponding to the LED elements placed at the ends of the light source chips 502 are for correcting the shift amounts of the light source chips 502 in the sub-scanning direction. The other register values are for correcting the tilt of the light source chips 502.

As described above, to perform the correction in the sub-scanning direction per pitch of 2400 dpi, the dot-data transfer unit 221 according to the present embodiment needs to adjust the resolution to 2400 dpi before the correction is performed based on the register values set in the correction-value register 222. Therefore, the dot-data transfer unit 221 according to the present embodiment performs the conversion of resolution when reading out the dot data from the line memory 210. For example, if the resolution of an image stored in the line memory 210 is 600 dpi, the dot-data transfer unit 221 converts the resolution to four times the resolution. The change of the resolution may be made by using a known technique such as by increasing the number of times of the read-out by a number according to the multiple of the change. Instead of performing the conversion of resolution by the dot-data transfer unit 221, the resolution may be changed when the dot data is read out from the page memory 311 to the line memory 210. Such a mode is implementable by, for example, providing a functional block for changing the resolution between the page memory 311 and the line memory 210.

Figure 14:
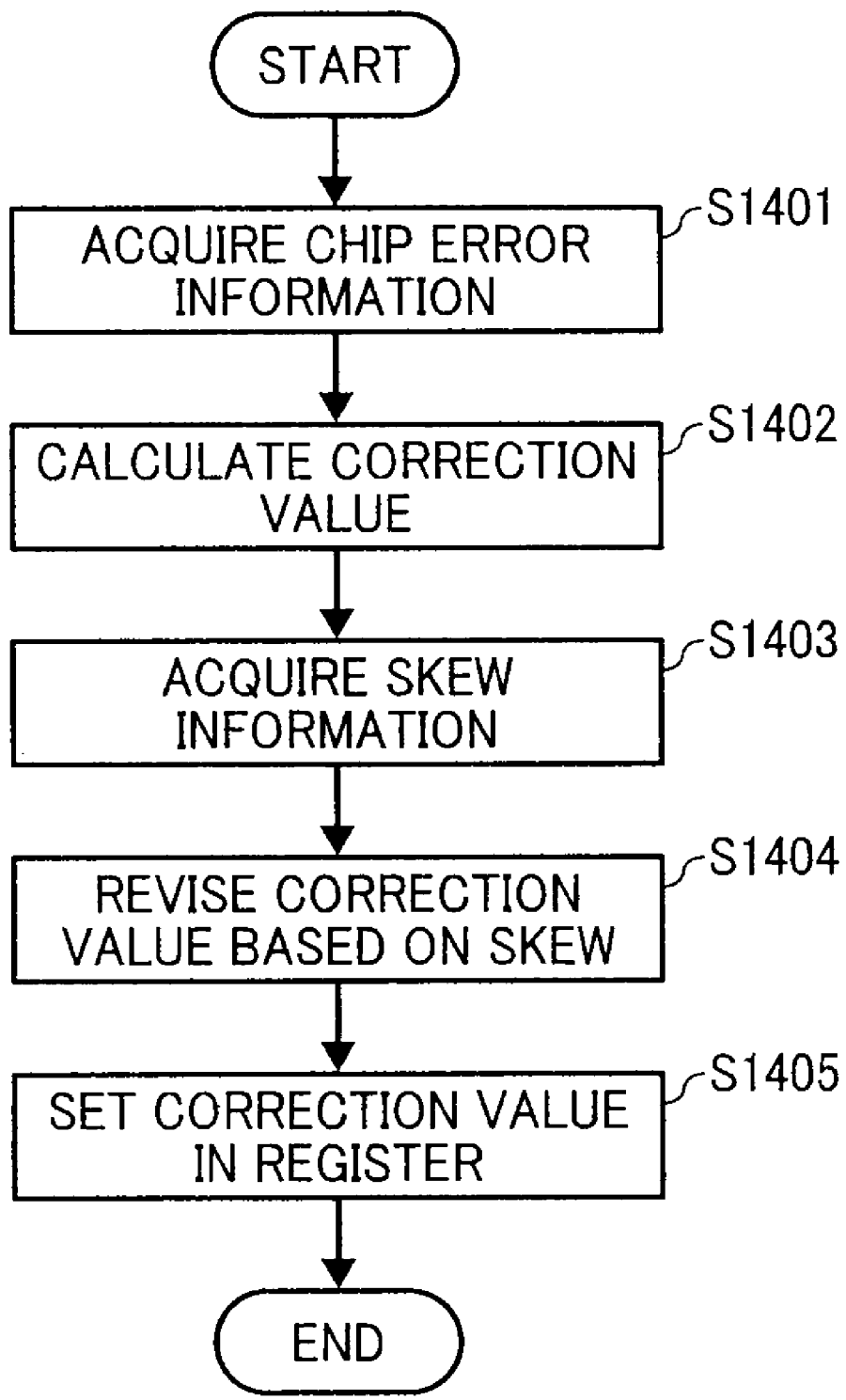
FIG. 14 is a flowchart for setting register values in the correction-value register according to the embodiment of the present invention.

Next, operation of setting the register values in the correction value register 222 by the LPH controller 220 according to the present embodiment is explained. FIG. 14 is a flowchart illustrating the correction-value setting operation by the LPH controller 220 according to the present embodiment. As illustrated in FIG. 14, first, the correction-value calculating unit 223 acquires chip error information from the chip-error storage unit 230 (Step S1401). That is, the correction-value calculating unit 223 functions as a placement-error-information acquiring unit.

After acquiring the chip error information, the correction-value calculating unit 223 calculates the correction values as described with reference to FIG. 9 (Step S1402). After calculating the correction value as illustrated in FIG. 9, the correction-value calculating unit 223 next acquires skew information from the skew storage unit 240 (Step S1403). That is, the correction-value calculating unit 223 functions as a tilt-information acquiring unit. Then, the correction-value calculating unit 223 revises the correction values calculated as illustrated in FIG. 9 at Step S1402 based on the skew information acquired at Step S1403 (Step S1404), and sets the revised correction values in the correction-value register 222 as described with reference to FIG. 13 (Step S1405). By such an operation, as described with reference to FIG. 13, the correction values are set in the correction-value register 222, and the process ends.

As described above, at Step S1404, the correction-value calculating unit 223 preferably performs the revision so that the dot arrangement after the correction becomes as close as possible to a straight line. As a method of this revision, for example, straight-line approximation may be used.

As to the timing to perform the straight-line approximation, for example, after the correction values calculated as illustrated in FIG. 9 are applied, the correction values based on the skew information may be further applied, and then the straight-line approximation may be performed at last. In this case, after the correction values in FIG. 9 are applied, the calculation is performed based on coordinate information on the position at which each dot is placed (the information in FIG. 8).

Furthermore, as to another example of the timing to perform the straight-line approximation, the straight-line approximation may be performed when the correction values calculated as illustrated in FIG. 9 are revised based on the skew information acquired at Step S1403.

Moreover, in the correction of positional deviation, in addition to performing the correction for each LPH 250, it is necessary to consider amounts of positional deviation among the different colors, that is, among the LPH-BK 251, the LPH-M 252, the LPH-C 253, and the LPH-Y 254. At this time, a combination of correction values is preferably selected so that the positional deviations among the colors are minimized instead of adapting, to a reference color selected from the colors, the other colors. In other words, in the correction of positional deviations among the colors, i.e., of color shifts, preferably various combinations of correction values of the colors are judged and a combination of correction values is selected so that the positional deviations among the colors are minimized.

As explained above, in the image forming apparatus 1 according to the present embodiment, for the optical writing device 111 including the LPH 250 with the plurality of light source chips 502, to correct the positional deviations among the plurality of light source chips 502 and positional deviation when mounting the LPH 250 on the optical writing device 111, the bit length of a register value for correcting a dot corresponding to the LED element placed at the border between the light source chips 502 is set longer than the bit length of a register value for correcting a dot corresponding to an LED element other than the LED element placed at the border. Consequently, the scale of the circuit providing the correcting function is reducible while accuracy of the correction of positional deviation is maintained. That is, it is possible to provide an optical writing device including a light-emitting body array composed of a plurality of light source chips connected in a main scanning direction, which is capable of correcting positional deviations among the light source chips and tilt of the light-emitting body array with a simple configuration.

In the above embodiment, as described with reference to FIG. 5, the line memory 210 has the storage area for holding the dot data of nine lines. This is just an example, and the number of lines of the dot data which the line memory 210 is able to hold is preferably determined depending on the amount of positional deviation of the LED element which may occur in the LPH 250.

The skew caused when the LPH 250 is installed in the optical writing device 111 is predictable from a mechanical tolerance. Furthermore, deviations among the light source chips 502 in the LPH 250 are identified as a specification of the LPH. Based on these two pieces of information, an upper limit of the amount of positional deviation of the LED elements which may occur in the LPH 250 is able to be specified. Therefore, the number of lines of dot data which the line memory 210 is able to hold may be determined depending on the amount of positional deviation of the LED element specified based on the two pieces of information.

Moreover, in the above embodiment, as illustrated in FIG. 4, as an example, the case has been explained in which the chip error information provided from the manufacturer of the LPH is stored in the chip-error storage unit 230, which is a storage area provided inside the optical writing device 111. Therefore, when the optical writing device 111 is assembled, the chip error information provided from the manufacturer of the LPH needs to be input to the chip-error storage unit 230. In this case, if wrong chip error information, such as chip error information of a different LPH 250, is input, wrong positional deviation correction is performed.

Yet, if a storage medium is added to the LPH 250, and the chip error information is stored in that storage medium, the correction-value calculating unit 223 is able to read out the chip error information from the storage medium provided in the LPH 250. In this case, there is no need to perform the information input process described above, and the wrong chip error information will not be applied.

Furthermore, in the above embodiment, as described with reference to FIG. 10, as an example, the case has been explained in which the bit length of the register is basically two bits, and the bit length of register values corresponding to the LED elements placed at intervals of 192 dots, i.e., at the end of each light source chips 502, is four bits. However, this is just an example, and the bit lengths are not particularly limited to two bits and four bits. One of the important points of the present embodiment is to make the bit length of a register value corresponding to the LED element placed at the end of each light source chip 502 longer than that of the other registers, i.e., to make it possible to hold a lot of information.

In other words, one of the important points of the present embodiment is that the position of a pixel corresponding to the LED element placed at the end of each light source chip 502 is more largely adjustable than the positions of pixels corresponding to the other LED elements.

[Other Embodiments]

Figure 15:
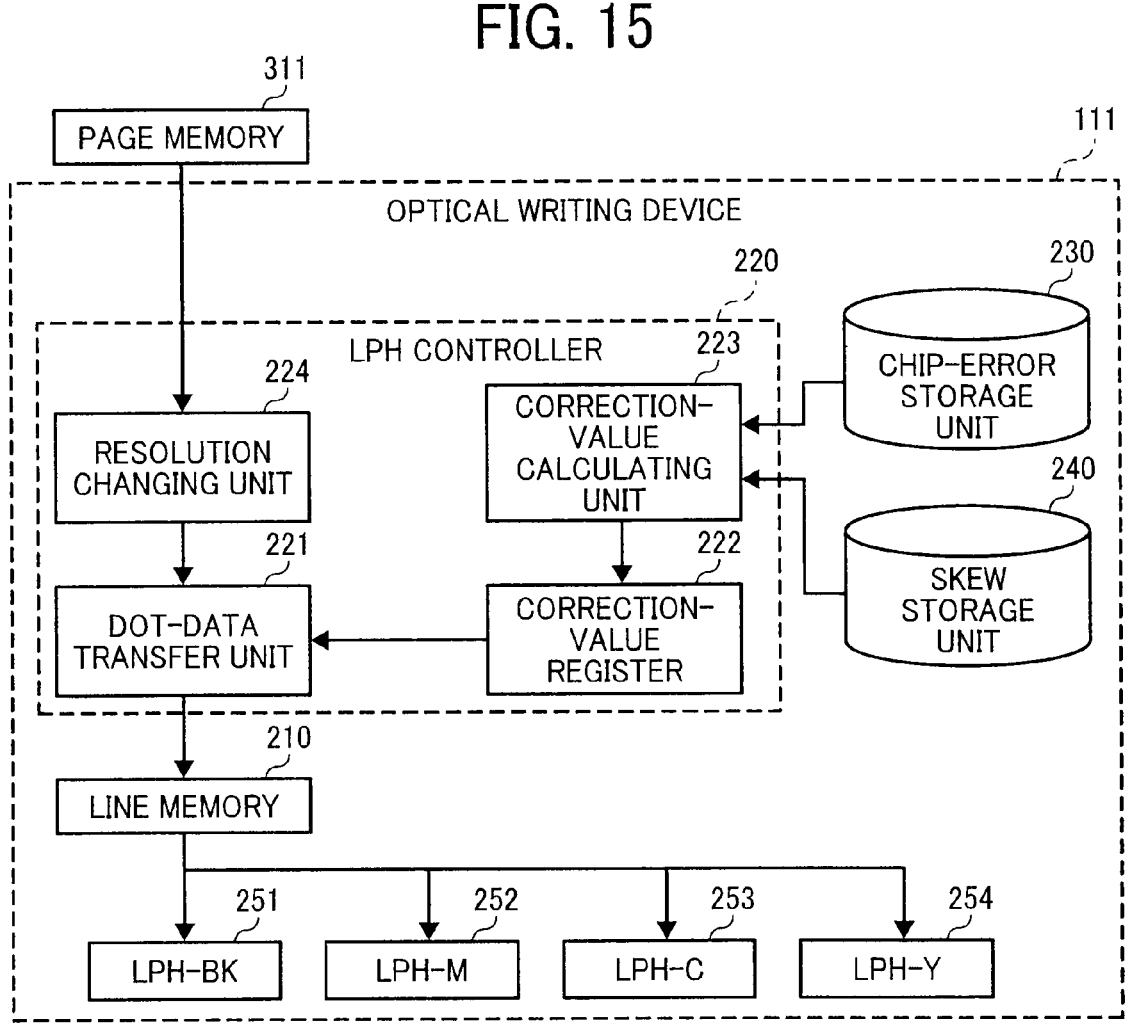
FIG. 15 is a block diagram illustrating a functional configuration of the optical writing device according to another embodiment of the present invention.

In the first embodiment, as an example, the case has been explained in which the LPH controller 220 performs the correction of positional deviation when the dot data is read out from the line memory 210. Alternatively, the correction of positional deviation may be performed before the dot data read out from the page memory 311 is written in the line memory 210. FIG. 15 is a block diagram illustrating a functional configuration of the optical writing device 111 in the case in which the correction of positional deviation is performed before the dot data is written in the line memory 210.

As illustrated in FIG. 15, the functional configuration included in the optical writing device 111 according to the present embodiment is the same as that of the first embodiment, and a connective relation between the functions is different from that of the first embodiment. The optical writing device 111 according to FIG. 15 differs from the first embodiment in that the LPH controller 220 is provided between the page memory 311 and the line memory 210. In FIG. 15, a resolution changing unit 224, which has been described as part of the function of the dot-data transfer unit 221 in the first embodiment, is newly illustrated.

By the configuration as illustrated in FIG. 15, the positional deviation of the LPH 250 is correctable before the dot data read out from the page memory 311 is written in the line memory 210. As a result, the dot data written in the line memory 210 has already been subjected to the correction of positional deviation, and thus the dot data is able to be directly input to the LPH 250. The same effects as in the first embodiment are obtainable by such a configuration.

Furthermore, in the above embodiments, as illustrated in FIG. 4 or FIG. 15, the case in which the LPH controller 220 included in the optical writing device 111 includes the positional deviation correcting function. However, the correction of positional deviation described above may be executed before raster data is stored in the page memory 311. In this case, the respective functions of the dot-data transfer unit 221, the correction-value register 222, the correction-value calculating unit 223, the chip-error storage unit 230, and the skew storage unit 240 are loaded in the image processing unit 33 or the engine control unit 31 in the controller 20. This also is able to achieve the above effects. Further, in this case also, the chip-error storage unit 230 and the skew storage unit 240 may be provided in the optical writing device 111 so that the controller 20 is able to read out information from the optical writing device 111.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device that exposes a photosensitive element of an image forming apparatus based on pixel data forming image information, the optical writing device comprising:

a light source including a plurality of light-emitting element arrays arranged in a main scanning direction, each light-emitting element array including a plurality of light-emitting elements arranged in the main scanning direction;

a correction-value holding unit configured to hold, correspondingly with a light-emitting element, a correction value for changing timing to read out the pixel data stored in an image storage unit; and a light-source drive unit configured to drive the light source by reading out the pixel data stored in the image storage unit, according to the correction value, wherein the correction-value holding unit includes a first holding area for holding a first correction value corresponding to a first light-emitting element located at an end of a light-emitting element array and a second holding area for holding a second correction value corresponding to a second light-emitting element other than the first light-emitting element, the first holding area being larger than the second holding area.

2. The optical writing device according to claim 1, wherein the light-source drive unit is further configured to change timing to read out pixel data corresponding to the second light-emitting element of the light-emitting element array including the first light-emitting element located at the end of the light-emitting element array, according to the first correction value corresponding to the first light-emitting element.

3. The optical writing device according to claim 1, wherein the first correction value corresponding to the first light-emitting element located at the end of the light-emitting element array held by the correction-value holding unit has a longer bit length than that of the second correction value corresponding to the second light-emitting element.

4. The optical writing device according to claim 1, further comprising a correction-value calculating unit configured to calculate a correction value for each light-emitting element based on placement error information related to an error in placement of a light-emitting element array in the light source and tilt information related to a tilt of the light source, wherein the correction-value holding unit is further configured to hold each correction value calculated.

5. The optical writing device according to claim 4, wherein the correction value calculating unit is further configured to calculate, as the first correction value corresponding to the first light-emitting element located at the end of the light-emitting element array, a correction value for correcting a deviation in a sub-scanning direction of the light-emitting element array including the first light-emitting element, and, as the second correction value corresponding to the second light-emitting element, a correction value for correcting a tilt of the light-emitting element array including the second light-emitting element.

6. The optical writing device according to claim 1, wherein the light-source drive unit is further configured to change a resolution of the image information when the pixel data is read out according to the correction value.

7. The optical writing device according to claim 1, wherein the correction-value holding unit is further configured to hold the correction value correspondingly with each light emitting element disposed at an interval of a predetermined number of the plurality of light-emitting elements of each light-emitting element array.

8. The optical writing device according to claim 7, wherein the predetermined number does not have a divisor of a prime number equal to or greater than 5.

9. The optical writing device according to claim 7, wherein the predetermined number is a divisor of the number of the plurality of light-emitting elements included in each light-emitting element array.

10. An image forming apparatus comprising the optical writing device according to claim 1.

11. A method of controlling an optical writing device that exposes a photosensitive element of an image forming apparatus based on pixel data forming image information and includes a light source including a plurality of light-emitting element arrays arranged in a main scanning direction, each light-emitting element array including a plurality of light-emitting elements arranged in the main scanning direction, the method comprising:
 calculating a correction value for each light-emitting element based on placement error information related to an error in placement of a light-emitting element array in the light source, and tilt information related to a tilt of the light source; and
 driving and controlling the light source by reading out the pixel data stored in an image storage unit according to the correction value calculated, wherein
 in the calculating, a first correction value corresponding to a first light-emitting element located at an end of the light-emitting element array is calculated, the first correction value having a longer bit length than that of a second correction value corresponding to a second light-emitting element other than the first light-emitting element.

12. A computer program product comprising a computer-usable medium having computer-readable program codes embodied in the medium for controlling an optical writing device that exposes a photosensitive element of an image forming apparatus based on pixel data forming image information, the optical writing device including a light source including a plurality of light-emitting element arrays arranged in a main scanning direction, each light-emitting element array including a plurality of light-emitting elements arranged in the main scanning direction, the program codes when executed causing the optical writing device to execute:
 calculating a correction value for each light-emitting element based on placement error information related to an error in placement of a light-emitting element array in the light source, and tilt information related to a tilt of the light source; and
 driving and controlling the light source by reading out the pixel data stored in an image storage unit according to the correction value calculated, wherein
 in the calculating, a first correction value corresponding to a first light-emitting element located at an end of the light-emitting element array is calculated, the first correction value having a longer bit length than that of a second correction value corresponding to a second light-emitting element other than the first light-emitting element.

* * * * *